(12) United States Patent
Schwendener et al.

(10) Patent No.: US 12,025,470 B2
(45) Date of Patent: Jul. 2, 2024

(54) STRUCTURED LIGHT PROJECTION THROUGH THE MINIMIZATION OF VISUAL ARTIFACTS BY WAY OF DELIBERATELY INTRODUCED OPTICAL ABERRATIONS

(71) Applicant: HEXAGON TECHNOLOGY CENTER GMBH, Heerbrugg (CH)

(72) Inventors: Andreas Schwendener, Chur (CH); Thomas Jensen, Rorschach (CH); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 605 days.

(21) Appl. No.: 17/318,311

(22) Filed: May 12, 2021

(65) Prior Publication Data
US 2021/0356267 A1 Nov. 18, 2021

(30) Foreign Application Priority Data
May 12, 2020 (EP) .................................... 20174176

(51) Int. Cl.
*G01C 3/08* (2006.01)
*G01C 3/18* (2006.01)

(52) U.S. Cl.
CPC ................. *G01C 3/08* (2013.01); *G01C 3/18* (2013.01)

(58) Field of Classification Search
None
See application file for complete search history.

(56) References Cited

U.S. PATENT DOCUMENTS 9,200,886 B2 12/2015 Nebosis et al.
10,168,525 B2 1/2019 Kim et al.
(Continued)

FOREIGN PATENT DOCUMENTS

CN 102483326 A 5/2012
CN 103459974 A 12/2013
(Continued)

OTHER PUBLICATIONS

CN Office Action dated Mar. 26, 2024 as received in Application No. 202110494399.3.
(Continued)

*Primary Examiner* — Luke D Ratcliffe
(74) *Attorney, Agent, or Firm* — Maschoff Brennan

(57) ABSTRACT

A triangulation device for measuring a measurement object by a projection of a structured light pattern onto the measurement object. The triangulation device includes a projector projecting the structured light pattern decomposable into different spatial frequencies onto the measurement object. The projector comprises a matrix of pixel elements and a lens system which determines a wavefront with a wavefront aberration from a reference wavefront, and a camera including a lens system and an imaging sensor, the camera being configured to receive the structured light pattern projected by the projector onto the measurement object, and a processing unit configured to provide distance information by evaluating imaging information provided by the camera. The wavefront aberration comprises a primary spherical aberration coefficient $Z_9$, wherein the primary spherical aberration coefficient $Z_9$ is larger than $0.5\lambda$, wherein $\lambda$ is a wavelength of the projected structured light pattern.

15 Claims, 2 Drawing Sheets

(a)

(b)

(56) References Cited

U.S. PATENT DOCUMENTS

| | | | |
|---|---|---|---|
| 10,228,243 B2 | 3/2019 | Kimura | |
| 11,448,762 B2 | 9/2022 | Schindler et al. | |
| 2010/0303341 A1 | 12/2010 | Hausler | |
| 2013/0242090 A1 | 9/2013 | Yoshikawa | |
| 2015/0136949 A1 | 5/2015 | De Nooij et al. | |
| 2016/0117561 A1 | 4/2016 | Miyazawa et al. | |
| 2018/0292656 A1* | 10/2018 | Geng | H04N 13/344 |
| 2019/0045173 A1* | 2/2019 | Hicks | G01B 11/2545 |
| 2020/0340908 A1* | 10/2020 | Cornelis | G03H 1/0443 |

FOREIGN PATENT DOCUMENTS

| | | |
|---|---|---|
| CN | 107850420 A | 3/2018 |
| CN | 108269258 A | 7/2018 |
| CN | 109507155 A | 3/2019 |
| CN | 111033300 A | 4/2020 |
| DE | 10 2004 026090 A2 | 12/2005 |
| DE | 10 2004 035 102 A1 | 2/2006 |
| EP | 3 502 660 A1 | 6/2019 |
| WO | 2011/000435 A1 | 1/2011 |

OTHER PUBLICATIONS

Sakohira et al., "Moire reducing two-dimensional diffractive optical low-pass filter made from molded plastic" Advances in Display Technologies VI, Proc. of PSIE vol. 9770 97700A-1, Mar. 7, 2016.
Li et al., "Spherical aberration and modulation transfer function" Satellite Data Compression, Communications, and Processing X, Proc. of SPIE vol. 0124 91241B-1, May 22, 2014.
EP Search Report in Application No. 20 17 4176 dated Nov. 2, 2020.

\* cited by examiner

STRUCTURED LIGHT PROJECTION THROUGH THE MINIMIZATION OF VISUAL ARTIFACTS BY WAY OF DELIBERATELY INTRODUCED OPTICAL ABERRATIONS

CROSS-REFERENCE TO RELATED APPLICATIONS

This application claims priority to Indian Patent Application No. 202011021043, filed on May 19, 2020. The foregoing patent application is herein incorporated by reference.

FIELD OF THE INVENTION

The present invention relates to a triangulation device using structured light projection.

BACKGROUND

Projecting structured patterns of light is a common technique to rapidly acquire 3D information about an object to be measured. In the simplest case, the triangulation system comprises a projector and a camera, the projector projecting a laser line onto the object and the camera capturing the corresponding scene. If the relative geometric configuration between the projector and the camera is known, then 3D information about the illuminated object can be deduced, as the laser line incident on the object is positioned at the intersection of a plane defined by projected laser line and the projector and the rays passing through the camera center of the camera and the location of the laser line on the image sensor of the camera. By sweeping the laser line across the object to be measured, 3D information about the object can be accurately captured. To accelerate the overall measurement process, it is common to replace the single projected laser line by a more complex pattern changing both in time and space. The projected structured patterns of light are coded; it is hence possible to obtain correspondences between image points and points of the projected pattern, wherefrom it is possible to triangulate the surface of the illuminated object. An additional benefit of using projected structured light is that it simplifies the correspondence problem typically encountered in more classical triangulation systems. Here, the same physical point whose 3D position is to be obtained must be identified in at least two images. Finding a sufficient number of such corresponding points in multiple images is in general a difficult computational problem.

In many different technical fields, it is desired to measure objects precisely, or to acquire further information about their internal composition. This applies in particular to the manufacturing industry which requires precise measuring and inspection processes in order to control the quality of its products. Triangulation scanners are commonly used to inspect surfaces of manufactured products. The principle of triangulation enables fast and precise scanning of surfaces. Measurement systems utilizing the triangulation principle are disclosed in DE 10 2004 026 090 A1 and WO 2011/000435 A1, for example.

Projectors using liquid-crystal displays (LCD) with a finite number of pixels require circuitry for accessing and controlling the individual pixels. Such circuitry is placed on a semiconductor chip close to each individual pixel. The area taken up on the semiconductor chip by such circuitry is in general not available for the actual imaging purpose leading to visual artifacts in the projected image as the lens system of the projector is typically good enough to resolve the circuitry area. For the case of digital light processing projectors, the micromirrors need to be placed with sufficient distance to each other, so that a tilting of individual micromirrors is possible. For metrological purposes, circuitry or micromirror artifacts are problematic as such visual artifacts might lead to wrong results in case 3D information is to be calculated. This is particularly true for neighboring pixel elements with a strong gradient, wherein one pixel is bright and the other dark. The circuitry or micromirror artifacts in between two pixel elements displace the local intensity centroid. In case structured light patterns are transmitted by the projector, wrong inferences can then be made due to the presence of the circuit or micromirror artifacts in the projected image.

It is therefore an objective of the present invention to provide for a triangulation device which reduces the circuit or micromirror visual artifacts in the projected image.

BRIEF DESCRIPTION

This objective is achieved by realizing at least part of the features of the independent claim. Features which further develop the invention in an alternative or advantageous manner are described in the dependent patent claims.

Some aspects of the invention relate to a triangulation device for measuring a measurement object by a projection of a structured light pattern onto the measurement object, the triangulation device comprising a projector configured to project the structured light pattern with projection light, the projection light comprising at least one wavelength k, onto the measurement object, the structured light pattern being decomposable into different spatial frequencies, the projector comprising a matrix of pixel elements, wherein an artifact pattern is defined by artifact regions between neighboring pixel elements, and a lens system, wherein the lens system is arranged so that the projection light passing through the lens system defines a wavefront with a wavefront aberration from a spherical reference wavefront, and a camera, the camera comprising a lens system and an imaging sensor, wherein the camera is configured to receive the structured light pattern projected by the projector onto the measurement object, and a processing unit configured to provide distance information by evaluating imaging information provided by the camera, wherein the wavefront aberration is defined, in particularly dominated, by a primary spherical aberration coefficient $Z_9$ of a Zernike decomposition, wherein Zernike polynomials defining the Zernike decomposition are ordered according to the Fringe Zernike coefficient ordering, wherein the primary spherical aberration coefficient $Z_9$ is larger than one fourth of the wavelength $\lambda$.

It is to be understood that the wavefront aberration is typically not only defined by the aberration coefficient $Z_9$, but other aberration coefficients may influence the shape of the wavefront aberration as well.

The spherical reference wavefront and the wavefront defined by the lens system of the projector may be defined at the exit pupil of the lens system. The spherical reference wavefront at the exit pupil of the lens system may characterize an ideal lens, for the spherical reference wavefront may sharply focus on a point on the image plane. Characterizing the wavefront aberrations by a Zernike decomposition may succinctly capture the relevant behavior of the lens system. The so called "Fringe Zernike" notation is known in both lens design programs and in interferometric metrology. The coefficients of the Zernike polynomials are often specified with the unit "waves", "waves" referring to the wavelength of the used light. Zernike polynomials are a representation of typical wavefront aberrations. Term number 9 describes "primary spherical aberration".

Lens systems are typically designed to reach a maximum modulation transfer function (MTF) under given constraints, i.e. the lens systems are optimized for image quality. To achieve a desirable MTF, aberrations can be combined to compensate each other to a certain degree, known as aberration balancing. Spherical aberration, for example, can be balanced with defocus to improve the MTF. Another classical balancing task is the combination of astigmatism, field curvature and defocus to find the best compromise for the MTF over the full field of view. Astigmatism and field curvature are worse for larger field angles, so a defocus decreases the MTF in the center of the field of view, but at least partially compensates field curvature and astigmatism for larger field angles. Additionally, manufacturing tolerances degrade the MTF by increasing aberrations due to detuned balancing of aberrations and due to asymmetries caused by lens element tilt and decentering. In practice, many real lenses have significant residual aberrations, even though they are properly optimized and have sufficient MTF for the application.

For lenses with small F-numbers, spherical aberration is more difficult to correct. A lens with a F-number like 2.8 or smaller and optimized for image quality tends to have more residual spherical aberration, e.g. a value of typically 0.1 waves for fringe Zernike term number 9 (primary spherical aberration). A lens with F-number 5.6 optimized for image quality can have fringe Zernike term number 9 of 0.01 waves or smaller, for example, due to its smaller aperture. These values are exemplary, as they also strongly depend on the effort taken to correct the lens, depending on the requirements and cost targets. Lenses with smaller F-Numbers like 2.8 or smaller, can also have residuals of 0.01 waves or less for Fringe Zernike term 9, but such lenses require more effort to achieve small residuals, i.e. they require more lens elements, tighter manufacturing tolerances and are therefore more expensive.

For modern cameras or consumer projectors optimized for image quality with 2 million or more pixels, the Fringe Zernike term number 9 is typically 0.1 waves or smaller, often significantly smaller. For a Full-HD DLP projector with pixel pitch of 5.4 µm, the Fringe Zernike term number 9 of the projection lens can be required to be 0.1 waves or smaller for projection of a Full-HD images with a crisp sharpness impression.

A triangulation device according to the invention having a projection lens with wavefront aberration characterized by Fringe Zernike term number 9 of one fourth of the wavelength $\lambda$ or higher allow both for enough MTF-contrast at the spatial frequencies of the projected sinusoidal pattern and for low MTF-contrast at the spatial frequencies of the artifact pattern.

In one embodiment, the primary spherical aberration coefficient $Z_9$ is larger than one third of the wavelength $\lambda$ or larger than one half of the wavelength $\lambda$.

In another embodiment, the triangulation device may additionally comprise a diffusion disk.

In another embodiment, the primary spherical aberration provides a low pass filter.

In another embodiment, the structured light pattern is embodied as a sinusoidal pattern.

A sinusoidal pattern can be designed in such a way so that it mostly contains low spatial frequencies.

In another embodiment, the Modulation Transfer Function (MTF) of the projector lens system is closer to diffraction limited MTF values than to zero at the spatial frequencies of the structured light pattern, and closer to zero than to diffraction MTF values at the spatial frequencies of the neighboring pixel element artifact pattern.

The diffraction MTF curve corresponds to the best possible resolution that the projector is in principle capable of, the diffraction MTF curve being reachable through the use of a perfect lens system. According to the invention, the structured light pattern can be projected with a high contrast, while the artifact pattern can be suppressed. By specifying that the MTF values of the projector lens system are closer to the diffraction MTF values than to zero at the spatial frequencies of the structured light pattern, it is possible that the structured light pattern is sufficiently strongly transmitted through the lens system of the projector. Equivalently, the specified conditions may guarantee that the artifact pattern is suppressed in a stronger fashion than the structured light pattern.

In another embodiment, the largest ratio between the MTF values of the projector lens system at the spatial frequencies of the neighboring pixel element artifact pattern to the MTF values of the projector lens system at the spatial frequencies of the structured light pattern is smaller than 0.5, in particular smaller than 0.25.

Both the neighboring pixel element artifact pattern and the structured light pattern may each comprise a plurality of spatial frequencies. The ratio may be taken between a value of the MTF curve evaluated at any spatial frequency of the neighboring pixel element artifact pattern and value of the MTF curve evaluated at any spatial frequency of the structured light pattern. From all such possible ratios, the largest ratio may be smaller than 0.5, in particular smaller than 0.25.

In another embodiment, the MTF value of the projector lens system at a spatial frequency of the neighboring pixel element artifact pattern is smaller than one half of the MTF value of the projector lens system at a spatial frequency of the structured light pattern.

In another embodiment, the MTF values are related to a point along the optical axis of the projector lens system, wherein the point lies in a pre-defined measurement range.

In another embodiment, the MTF is substantially preserved across the entire projected structured light pattern, wherein any two arbitrary points on the measurement object onto which the structured light pattern is projected, the arbitrary points lying on parts of the surface of the measurement object illuminated by the structured light pattern, possess substantially equal MTF curves.

The desired MTF curve characterizes the optical behavior of the projector in the entire field of view of the projector.

In another embodiment, the lens system of the projector is focused with respect to a pre-defined measurement range.

The triangulation device is configured to operate within a pre-defined measurement range. The structured light pattern projected by the projector onto a surface of a measurement object, assuming the lens system of the projector is in its first or second state, located within the pre-defined measurement range is sharp, respectively substantially sharp.

In another embodiment, the surface of the measurement object onto which the structured light pattern is projected is located within the pre-defined measurement range.

In another embodiment, the projector is embodied as a digital light processing projector, with an artifact region between two neighboring pixel elements having an extent of at most 15%, in particular at most 10%, of the individual pixel element width.

The invention relates in general to any projector of a triangulation device having light-generating pixel elements.

In another embodiment, the triangulation device comprises a further camera, the further camera comprising a lens system and an imaging sensor, and the camera of the triangulation device and the further camera are placed symmetrically around the projector, wherein the processing unit is configured to provide distance information by evaluating imaging information provided by the camera and the further camera.

The triangulation device is capable of evaluating the images provided by two cameras, thereby potentially improving the estimation of distance information. The two cameras may also be placed asymmetrically around the projector.

In another embodiment, the structured light pattern is designed to contain spatial frequencies whose maximum value, is smaller than a smallest spatial frequency of the neighboring pixel element artifact pattern.

If the average value of the spatial frequencies present in the structured light pattern is smaller than some pre-defined number, the smallest spatial frequency, and if all spatial frequencies of the artifact pattern are equal or larger than said pre-defined number, it is guaranteed that some spatial frequencies present in the structured light pattern are not present in the artifact pattern. An additional filtering step implemented through additional optical aberrations is therefore in principle capable of partly separating the structured light pattern from the artifact pattern by reducing the contrast of the artifact pattern more strongly than the contrast of the structured light pattern.

In another embodiment, the smallest spatial frequency is a lower bound, in particular the greatest lower bound, for the set of spatial frequencies of the neighboring pixel element artifact pattern.

Any number for which it is known that it is smaller than all spatial frequencies of the artifact pattern can be chosen as smallest spatial frequency. The lower the smallest spatial frequency is chosen, however, the faster the desired MTF curve has to fall as well if it is to be guaranteed that spatial frequencies larger than the smallest spatial frequency are sufficiently damped. A conservative estimate of the smallest spatial frequency places therefore a greater burden on the design of the lens system. The greatest lower bound is the best possible estimate as a spatial frequency of the artifact pattern exists which is equal to the greatest lower bound, while no spatial frequency smaller than the greatest lower bound exists.

In another embodiment, the spatial frequencies of the structured light pattern are disjunct from the spatial frequencies of the neighboring pixel element artifact pattern.

In case the spatial frequencies of the structured light pattern and the artifact pattern are disjunct, perfect filtering would be able to separate the two patterns.

BRIEF DESCRIPTION OF THE DRAWINGS

The inventive system is described below in more detail purely by way of example with the aid of concrete exemplary embodiments illustrated schematically in the drawings, further advantages of the invention also being examined. Identical elements are labelled with the same reference numerals in the figures. In detail.

DETAILED DESCRIPTION

Figure 1:
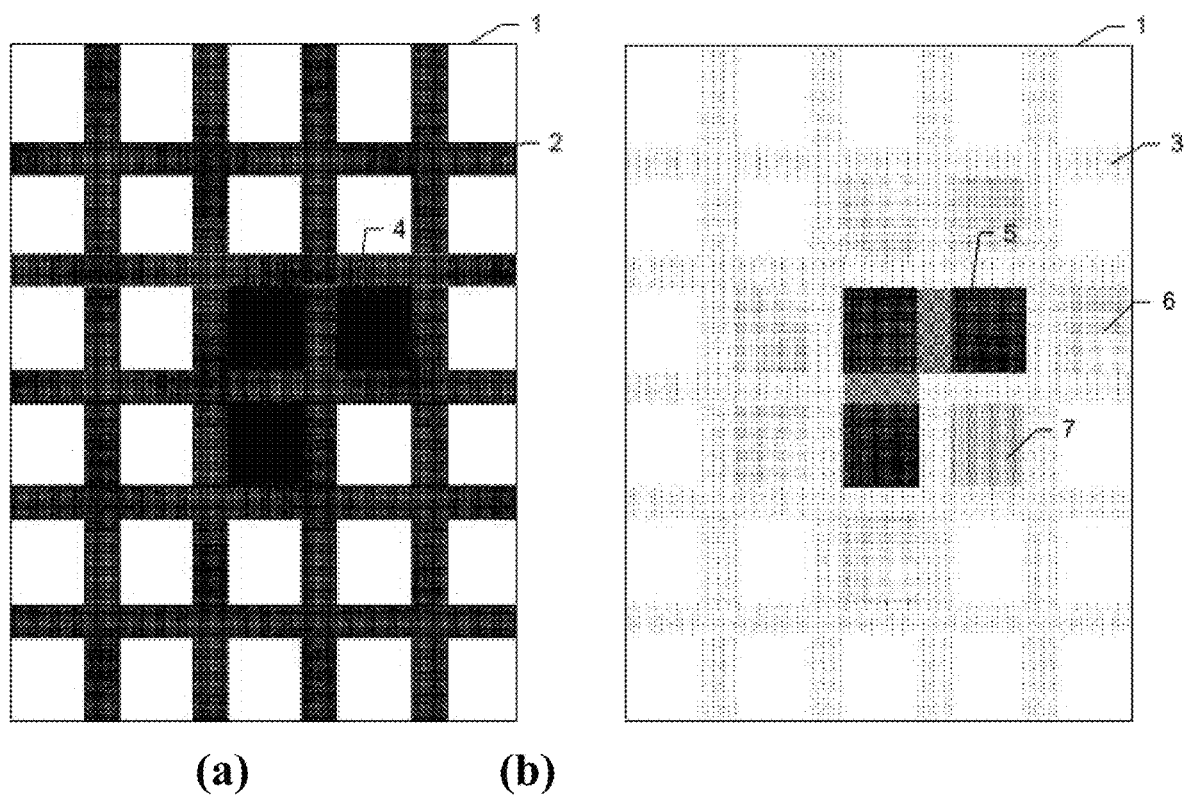
FIG. 1 shows an illustration of the impact of using a projector lens system with wavefront aberration according to the invention on a projected structured light pattern, wherein the structured light pattern is projected onto a measurement object.

FIG. 1 shows an illustration of the impact of using a projector lens system with wavefront aberration according to the invention on a projected structured light pattern, wherein the structured light pattern is projected onto a measurement object.

FIG. 1a shows the projected pattern, the pattern being projected onto a planar surface. The plane onto which the pattern is projected is in focus, i.e. the pattern is projected sharply. Additionally, it is assumed in FIG. 1a that the lens system of the projector is optimized for image quality; the lens system is optimized in such a way as to minimize optical aberration errors. The projected matrix of pixel elements occupies a compact region on the planar surface 1 on account of the fact that the projector comprises a finite number of pixel elements and the magnification factor of the lens system is finite.

In between pixel elements 4,5 there exists in general a region 2,3 which is not illuminated. This region is for example reserved for circuit pathways used for accessing the individual pixel elements of a semiconductor chip. The region may also be needed such that micromirrors are able to tilt. As the region 2,3 between pixel elements is not illuminated, it appears as a fine mesh on the planar surface onto which the projector projects. In FIG. 1, a mesh is shown for a rectangular arrangement of pixel elements. Similar considerations, however, apply for more general pixel element arrangements such as hexagonal grids.

The fine mesh corresponding to region 2,3 leads to visible artifacts in case the projected pattern is imaged by a high-resolution camera. Automatic processing of recorded images is hampered by such visual artifacts as local intensity maxima of projected patterns might be shifted between neighboring pixels in case of a light/dark transition between said neighboring pixels.

In FIG. 1b, the same pattern as in FIG. 1a is projected onto the planar surface, with the lens system of the projector designed according to the invention. The lens system according to the invention low-pass filters the entire projected image. Sharp transitions are strongly damped, while gradual transitions in the image are effectively preserved in magnitude by the added optical aberrations.

In case a projected structured light pattern is characterized by low spatial frequencies and the artifact mesh (neighboring pixel element artifact pattern) by high spatial frequencies, the lens system of the projector according to the invention preserves the structured light pattern while mostly dampening the artifact mesh. Compared to the artifact mesh 2 in FIG. 1a, the artifact mesh 3 in FIG. 1b is damped. The structured light pattern, however, is partly blurred as well, so that information from a pixel element 5 is moved to other pixel elements 6,7. The strength of such a blurring effect at any point of the surface of the measurement object on which the image is projected depends on the intensity of all pixel elements in its vicinity. The projected structured light pattern is therefore better visible in the projected image than the artifact mesh. Further processing therefore profits from the partial suppression of the artifact mesh as the required structured light pattern can be extracted with fewer errors.

Figure 2:
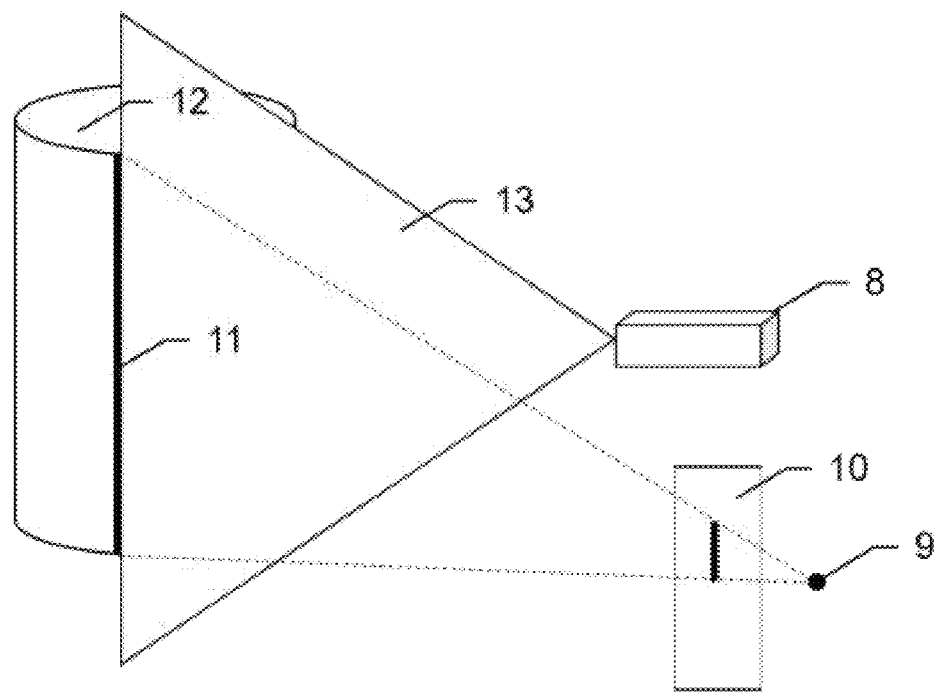
FIG. 2 shows an illustration of a triangulation device used.

FIG. 2 shows an illustration of a triangulation device comprising a projector 8 configured to project a structured light pattern and a camera.

In FIG. 2, the projector emits a single line of light. Upon incidence on the surface of a measurement object 12, the incident line of light 11 is in general curved. A camera, mathematically characterized by a camera center 9 and an image plane 10, receives an image of the projected structured light pattern, the structured light pattern in FIG. 2 embodied as a line. Besides lines, however, more general structured light patterns can be used.

The information received by the camera and geometric a priori information on the relative location of the camera to the projector 8 can then be used to infer the distance from the triangulation device of the entire projected line at once. The 3D position of the projected line lies on the intersection of the triangle 13 associated to the projector 8 and the projected line of light and the rays going through the camera center 9 and the points in the image plane 10 onto which the projected line of light is imaged. The distance information can be extracted through the use of a processing unit operating on images received by the camera. The processing unit can first identify the position of the line in the image received by the camera and can then use this information to infer the distance of the entire projected line to the triangulation device at once.

The lens system of the projector 8 is deliberately designed in such a way according to the invention to mainly propagate a structured light pattern and to strongly dampen the artifact mesh.

While the structured line pattern shown in FIG. 2 is a simple line of light, requiring a sweeping of the line of light across the entire measurement object in case full 3D information is desired, it is also possible to design more complex structured light patterns which allow for capturing the entire surface of a measurement object at once. Such complex structured light patterns can be designed according to the invention in such a way that their spatial frequencies are well separated from the spatial frequencies of the artifact mesh as this allows for a filtering step to remove one while keeping the other. The filtering step according is performed by designing the lens system of the projector according to the invention.

An example of complex structured light patterns are multi-frequency sinusoids composed of sinusoidal patterns with different frequencies within a narrow band of frequencies, wherein each frequency is projected several times with different phase shifts. Another example of complex structured light patterns is obtained through the combination of the binary Gray code with phase shifts of a sinusoid, wherein a single sinusoid pattern (with a few phase shifts) used for fine measurement is combined with a set of rough binary patterns that extend the non-ambiguous range by providing a code that enumerates the sinusoid periods.

Figure 3:
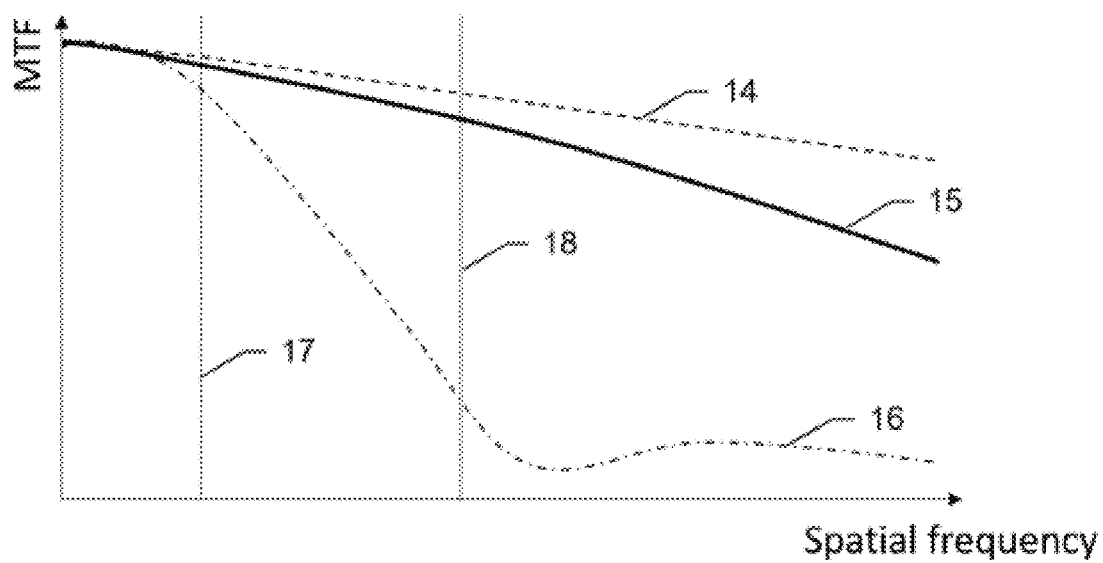
FIG. 3 shows an illustration of a Modulation Transfer Function (MTF) according to the invention and a MTF of a lens system designed for image quality.

FIG. 3 shows an illustration of a Modulation Transfer Function (MTF) according to the invention and a MTF of a lens system designed for image quality. All curves in FIG. 3 relate to the same point in the field of view of the projector.

The best possible MTF curve, assuming a perfect lens system, is given by a diffraction MTF curve 14. A lens system of the projector optimized according to prior art for image quality typically possesses an MTF curve 15 which is close to the diffraction MTF curve 14 at low spatial frequencies and deviates away from the diffraction MTF curve 14 at higher spatial frequencies.

Designing a lens system of the projector according to the invention changes the MTF curve, wherein the new MTF curve 16 shows stronger damping at higher spatial frequencies than the MTF curve 15 of a lens system designed for image quality. In case the spatial frequency 17 of the structured light pattern is low enough, the lens system according to the invention and a lens system optimized for image quality have similar MTF values at a spatial frequency 17 of the structured light pattern, while a smallest spatial frequency 18 as well as higher spatial frequencies of the artifact mesh are damped more strongly by the lens system according to the invention than by a lens system designed for image quality. The lens system according to the invention therefore mostly preserves the contrast at low spatial frequencies while effectively reducing higher-frequency artifacts.

It goes without saying that these figures illustrated are merely schematics of possible exemplary embodiments.

Although the invention is illustrated above, partly with reference to some preferred embodiments, it must be understood that numerous modifications and combinations of different features of the embodiments can be made. All of these modifications lie within the scope of the appended claims.

What is claimed is:

1. A triangulation device for measuring a measurement object by a projection of a structured light pattern onto the measurement object, the triangulation device comprising:
   a projector configured to project the structured light pattern with projection light, the projection light comprising at least one wavelength $\lambda$, onto the measurement object, the structured light pattern being decomposable into different spatial frequencies, the projector comprising:
      a matrix of pixel elements, wherein an artifact pattern is defined by artifact regions between neighboring pixel elements, and
      a lens system, wherein the lens system is arranged so that the projection light passing through the lens system defines a wavefront with a wavefront aberration from a spherical reference wavefront;
   a camera comprising a lens system and an imaging sensor, wherein the camera is configured to receive the structured light pattern projected by the projector (8) onto the measurement object; and
   a processing unit configured to provide distance information by evaluating imaging information provided by the camera,
   wherein the wavefront aberration is defined by a primary spherical aberration coefficient $Z_9$ of a Zernike decomposition, wherein Zernike polynomials defining the Zernike decomposition are ordered according to the Fringe Zernike coefficient ordering, wherein the primary spherical aberration coefficient $Z_9$ is larger than one fourth of the wavelength $\lambda$.

2. The triangulation device according to claim 1, wherein the primary spherical aberration coefficient $Z_9$ is larger than one third of the wavelength $\lambda$ or larger than one half of the wavelength $\lambda$.

3. The triangulation device according to claim 1, wherein the primary spherical aberration provides a low pass filter.

4. The triangulation device according to any claim 1, wherein the structured light pattern is embodied as a sinusoidal pattern.

5. The triangulation device according to claim 1, wherein the Modulation Transfer Function (MTF) of the projector lens system is closer to diffraction MTF values than to zero at the spatial frequencies of the structured light pattern, and closer to zero than to diffraction MTF values at the spatial frequencies of the neighboring pixel element artifact pattern.

6. The triangulation device according to claim 1, wherein the largest ratio between the MTF values of the projector lens system at the spatial frequencies of the neighboring pixel element artifact pattern to the MTF values of the projector lens system at the spatial frequencies of the structured light pattern is smaller than 0.5.

7. The triangulation device according to claim 1, wherein the MTF value of the projector lens system at a spatial frequency of the neighboring pixel element artifact pattern is smaller than one half of the MTF value of the projector lens system at a spatial frequency of the structured light pattern.

8. The triangulation device according to claim 5, wherein the MTF values are related to a point along the optical axis of the projector lens system, wherein the point lies in a pre-defined measurement range.

9. The triangulation device according to claim 1, wherein the MTF 15 preserved across the entire projected structured light pattern, and wherein any two arbitrary points on the measurement object onto which the structured light pattern is projected possess substantially equal MTF curves, the arbitrary points lying on a portion of the surface of the measurement object illuminated by the structured light pattern.

10. The triangulation device according to claim 1, wherein the lens system of the projector is focused with respect to a pre-defined measurement range.

11. The triangulation device according to claim 10, wherein the surface of the measurement object onto which the structured light pattern is projected is located within the pre-defined measurement range.

12. The triangulation device according to claim 1, wherein the projector is embodied as a digital light processing projector, using a digital mirror device (DMD), or as an LCD projector, or as an OLED projector, with an artifact region between two neighboring pixel elements having an extent of at most 15% of the individual pixel element width.

13. The triangulation device according to claim 1, wherein the triangulation device comprises a second camera, the second camera comprising a lens system and an imaging sensor, and the camera of the triangulation device and the second camera are placed symmetrically around the projector, wherein the processing unit is configured to provide distance information by evaluating imaging information provided by the camera and the second camera.

14. The triangulation device according to claim 1, wherein the structured light pattern is designed to contain spatial frequencies whose average value is smaller than a smallest spatial frequency of the neighboring pixel element artifact pattern.

15. The triangulation device according to claim 14, wherein the smallest spatial frequency is a lower bound for the set of spatial frequencies of the neighboring pixel element artifact pattern, or the spatial frequencies of the structured light pattern are disjunct from the spatial frequencies of the neighboring pixel element artifact pattern.

* * * * *